United States Patent [19]

Jones et al.

[11] 4,085,584
[45] Apr. 25, 1978

[54] BARRIER SYSTEM FOR DUAL-PULSE ROCKET MOTOR

[75] Inventors: Roy A. Jones, Crawford; Marshall W. Mabry, Waco, both of Tex.

[73] Assignee: The United States of America as represented by the Secretary of the Air Force, Washington, D.C.

[21] Appl. No.: 734,158

[22] Filed: Nov. 5, 1976

[51] Int. Cl.² .............................................. F02K 9/04
[52] U.S. Cl. ...................................... 60/250; 60/254; 60/255; 60/256; 102/103
[58] Field of Search ................. 60/250, 254, 255, 256, 60/200 A; 102/103, 49.7

[56] References Cited

U.S. PATENT DOCUMENTS

| | | | |
|---|---|---|---|
| 3,022,735 | 2/1962 | Eberle | 60/255 |
| 3,029,736 | 4/1962 | De Shazo | 60/255 |
| 3,128,600 | 4/1964 | Oldham | 60/250 |
| 3,142,959 | 8/1964 | Klein | 60/250 |
| 3,263,613 | 8/1966 | Rice et al. | 102/103 |
| 3,293,855 | 12/1966 | Cuttill et al. | 60/250 |
| 3,701,256 | 10/1972 | Pelham et al. | 60/256 |

*Primary Examiner*—Robert E. Garrett
*Attorney, Agent, or Firm*—Joseph E. Rusz; William J. O'Brien

[57] ABSTRACT

A barrier system for use in preventing the pre-ignition of second pulse rocket grains in a dual pulse rocket motor. The system includes two double layers of rubber material positioned between the first and second pulse grains with an igniter assembly adjacent to the second grain.

1 Claim, 1 Drawing Figure

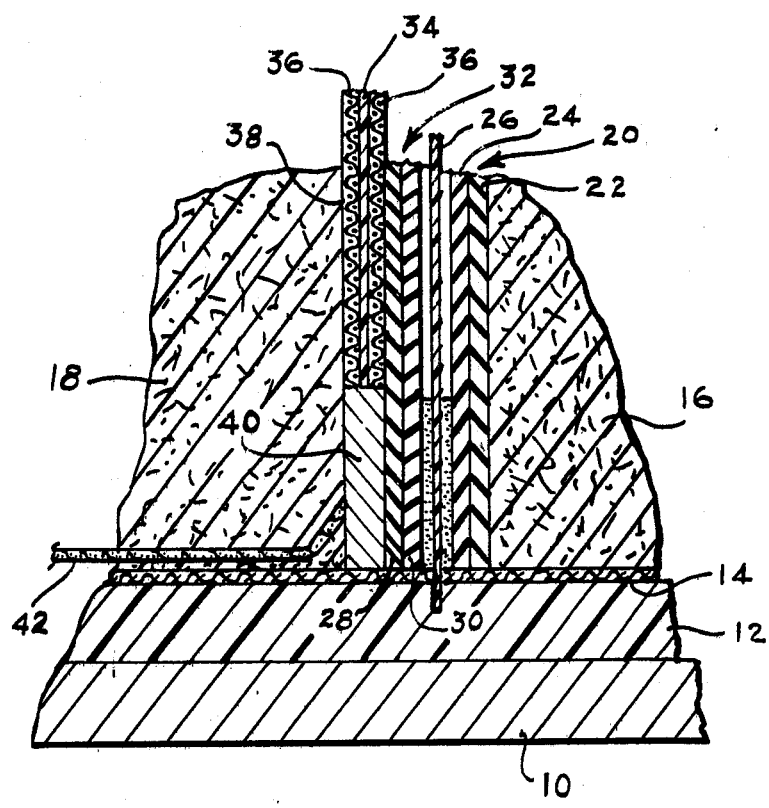

BARRIER SYSTEM FOR DUAL-PULSE ROCKET MOTOR

BACKGROUND OF THE INVENTION

This invention relates to solid propellant rocket motors and, more particularly, to a barrier system to be placed between the two pulse grains of a dual pulse solid propellant rocket motor.

In a solid propellant rocket motor, the propellant material is contained within a combustion chamber which confines the reaction products of combustion. The physical body or mass of the propellant material is referred to as the grain and, in some motors, there is more than one grain inside the combustion chamber. This arrangement is called a dual pulse motor and its operation presents an ignition problem. If the separate grains within the same combustion chamber are not properaly separated, then the ignition of one pulse grain often initiates the premature combustion of the second pulse grain.

As a consequence of the above, a considerable research effort has evolved with the purpose of providing a proper barrier which will prevent second pulse ignition during first pulse burning. Another problem is involved in the igniting of the second pulse grain since it must take place at a predetermined time after the first pulse grain burnout. Concurrent with the above problems is the fact that the structural and thermal integrity of the dual pulse motor must be maintained during its operational phase.

Previous attempts at solving the above problems have not proved too successful. However, with the present invention, a barrier system has been found that can effectively prevent the ignition problems of dual pulse motors. The barrier system is composed of two double layers of rubber forming a restrictor assembly in which one double layer forms a grain restrictor for pulse grain No. 1 and the second double layer forms a thermal barrier for pulse grain No. 2. The restrictor assembly is positioned between the first and second pulse grains to form an ignition barrier and in turn is adhesively attached to the rocket case liner by means of a rubber impregnated glass cloth.

Accordingly, the primary object of this invention is to provide a barrier system for overcoming the ignition problems encountered during the operation of dual pulse rocket motors.

Another object of this invention is to provide a barrier system to be placed between the first and second pulse grains of a solid propellant dual pulse rocket motor.

Still another object of this invention is to provide a barrier system for dual pulse rocket motors that is capable of preventing second pulse grain ignition during first pulse grain burning.

A further object of this invention is to provide a barrier system for dual pulse rocket motors that allows for the ignition of the second pulse grain at an appointed time after first pulse grain burnout.

Still a further object of this invention is to provide a barrier system that maintains structural and thermal integrity of the total motor during its operational phase while simultaneously overcoming the ignition problems often encountered with dual pulse rocket motors.

The above and still further objects and advantages of the present invention will become more readily apparent upon consideration of the following detailed description thereof when taken in conjunction with the accompanying drawing.

BRIEF DESCRIPTION OF THE DRAWING

In the Drawing:

The FIGURE represents a cross-sectional view of the barrier system of this invention positioned between two pulse grains in a dual pulse rocket motor.

DESCRIPTION OF THE PREFERRED EMBODIMENT

The present invention is predicated upon the discovery that a barrier system configurated in accordance with this invention successfully overcomes the ignition problems often encountered during the operation of dual pulse rocket motors. In order to more fully understand the invention, the following detailed description is presented by way of reference to the drawing.

In the FIGURE of the drawing there is shown the barrier assembly of this invention which is positioned within a rocket motor having an aluminum case 10 and a conventional plastic case liner 12. A rubber impregnated glass cloth 14 is adhesively bonded to the inside diameter of the case liner 12 using a conventional epoxy resin as the adhesive material. The barrier system is positioned between a first pulse grain 16 and a second pulse grain 18. The barrier system comprised of a restrictor assembly 20 composed of double layers of rubber 22 and 24 which is positioned adjacent to the first pulse grain. This restrictor assembly acts as the first pulse forward grain inhibitor and the flame barrier during burnout of the first pulse grain.

Next is a thin separator sheet 26 of Mylar plastic which is utilized to prevent cohesive bonding of adjacent layers, thereby allowing adequate pressure balance between the two pulse grains during motor ignition and first pulse pressure decay. The Mylar film 26 and the rubber sheets 22 and 24 are adhesively bonded using a flexible resin adhesive. Just forward of the separator film 26 are two more sheets of rubber 28 and 30 which form a thermal barrier 32 for the second pulse grain 18. The thermal barrier 32 is similar to the restrictor 20 in construction and application to the case liner 12. Forward of the thermal barrier 32 is a conventional pyromesh ignition assembly 34 which is covered by an aluminum support sheet 36. The assembly 34 and sheet 36 are also covered with a thin separator film 38 composed of a sheet of Mylar plastic. The igniter assembly 34 and the thermal barrier assembly 32 are bonded together by means of a flexible resin adhesive, and attached to an igniter support 40 to form a sealed unit which permits the casting of the second pulse grain 18 directly against the separator film 38 which covers the igniter. The thermal barrier assembly 32 prevents inadvertent ignition of the second pulse grain during firing of the first pulse grain. An electric lead 42 provides the means for conducting an electric current to activate the igniter 34 which in turn ignites the second pulse grain. At that point both the thermal barrier assembly 32 and the restrictor barrier assembly 20 break apart without ejecting large pieces of material to possibly clog the rocket nozzle. These two barriers break apart without unduly loading the case liner 12, thereby preventing the successful burning of the second pulse grain 18. The first pulse grain 16 was initially ignited by also using a conventional pyromesh igniter not shown.

Testing of the barrier system of this invention was designed and set up to examine blow-out characteristics of the thermal barrier. The test configuration, the same configuration as shown in the drawing, simulated the interface between grains in a dual-grain pulse motor configuration. The No. 1 grain restrictor, and the No. 2 grain thermal barrier assembly each consisted of the barrier system described previously.

A pyromesh igniter 34 was placed inside the second-pulse thermal barrier 32 and bonded around the outer periphery to provide second-pulse grain ignition. The igniter was then covered with a thin (0.002 inch) sheet 38 of Mylar. An inert propellant simulating the second-pulse grain was cast onto the thermal barrier/igniter assembly. During the barrier test, high speed photography was used to assess restrictor and thermal barrier rupture characteristics.

The high speed film of the first test indicated the igniter opened the barrier in a ballooning, pulsating fashion. The barrier ballooned out ~20 inches and back in ~10 inches, twice in a pulsing type action before rupturing. The circular shaped rubber barrier did tear in the desired fashion. No pieces of rubber were torn loose at the case wall. Examination of the inert propellant surface after the test revealed no damage occurred due to the igniter.

After successful completion of the first test, a second test using live propellant was planned to evaluate the installation technique for the full-scale motor, as well as the barrier break-up pattern under conditions similar to the actual motor.

In this second test, the second pulse thermal barrier and the first-pulse restrictor were identical to those used in the first test except for the use of live propellant grains. A simulated first-pulse grain was also cast for this test to provide the burn-out characteristics of the first pulse. Charges of a conventional propellant were cast by direct pour on each side of the barrier. The second-pulse charge, consisting of a 1-inch propellant layer (~10 lb), was cast over the second-pulse Pyromesh igniter, cured and then restricted. A 0.7 inch thick layer of propellant (8.8 lb) was next cast as the first pulse-charge and cured. A circular Pyromesh igniter was used to ignite this grain.

Two thermocouples were used in the second test. One was located forward of the restrictor on the forward end of the first-pulse grain; the second, forward of the thermal barrier protecting the second-pulse grain and igniter. No temperature rise was registered by either thermo-couple until after burnout of the simulated first-pulse grain. Burn time was 11 seconds for the first pulse, 30 seconds downtime, and 16 seconds for the second pulse. During the 30 seconds downtime the two rubber barriers had a 35° (F) temperature rise, but the one next to the second-pulse igniter had no significant rise. Rupture of the thermal barriers in this second test was in a pulsating, ballooning fashion similar to that noted in the first barrier test. Post test examination indicated excellent condition of the case liner.

From all respects, the barrier system tests were successful.

While this invention has been described by reference to a specific embodiment thereof, it is to be understood that the invention is not limited thereto, but includes within its scope such modifications and alterations as come within the spirit of the appended claims.

What is claimed is:

1. A barrier system for use in dual pulse, solid propellant rocket motors comprising an assembly positioned between a first and second pulse rocket propellant gain, said assembly being adhesively attached at one end to the interior diameter of a rocket motor case liner and composed of (1) a restrictor assembly having (a) a dual layer of rubber with one surface thereof positioned adjacent to said first pulse grain to function as a grain inhibitor and flame barrier during the burnout of the said first pulse grain and (b) a thin plastic film positioned adjacent to the other surface of said dual layer of rubber; (2) a thermal barrier assembly having a dual layer of rubber positioned adjacent to said thin plastic film of said restrictor assembly; and (3) an igniter assembly covered by a thin plastic film and positioned adjacent to said thermal barrier assembly, and interdisposed between said thermal barrier assembly and said second pulse grain to activate the ignition of said second pulse grain subsequent to the burnout of said first pulse grain.

* * * * *